United States Patent
Andersen et al.

(10) Patent No.: US 6,267,019 B1
(45) Date of Patent: Jul. 31, 2001

(54) APPLICATOR FOR PROTECTIVE COATINGS

(75) Inventors: Criston H. Andersen, Atlanta, GA (US); James E. Culpepper, Clayton, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/409,037

(22) Filed: Sep. 29, 1999

(51) Int. Cl.[7] ............................................. F16J 15/50
(52) U.S. Cl. .................................. 74/18.2; 277/30
(58) Field of Search ............................. 74/17.8, 17.5, 74/18, 18.2; 277/30; 403/50, 51

(56) References Cited

U.S. PATENT DOCUMENTS

| | | |
|---|---|---|
| 3,886,804 * | 6/1975 | Winfield, Jr. .................... 74/18.2 |
| 4,224,808 | 9/1980 | Gehrke ............................ 64/32 F |
| 4,440,372 | 4/1984 | Wisniewski ...................... 248/406 |
| 4,457,641 | 7/1984 | Smith .............................. 401/135 |
| 4,529,213 | 7/1985 | Goodman ...................... 277/212 FB |
| 4,676,513 | 6/1987 | Tiegs et al. ................... 277/212 FB |
| 5,078,652 | 1/1992 | Baker .............................. 464/175 |
| 5,182,956 | 2/1993 | Woodall et al. .................. 74/18.2 |
| 5,562,005 * | 10/1996 | Boyen et al. ..................... 74/18.2 |

* cited by examiner

*Primary Examiner*—David Fenstermacher
(74) *Attorney, Agent, or Firm*—Thomas L. Derry

(57) ABSTRACT

Hydraulic cylinder rods on machines can be protected by applying a thin coating of protectant to the surface of the rod. The present invention provides a flexible, impervious sleeve having first and second ends and first and second edges connecting the ends. One end of the sleeve has a wiper portion which is secured around the cylinder rod while the other end of the sleeve is secured relative to the hydraulic cylinder. The edges of the sleeve wrap around the rod and a reserve of protectant and, when fastened together, form a closed member. Upon extension of the rod, the protectant is forced into the wiper portion and spread onto the rod.

9 Claims, 2 Drawing Sheets

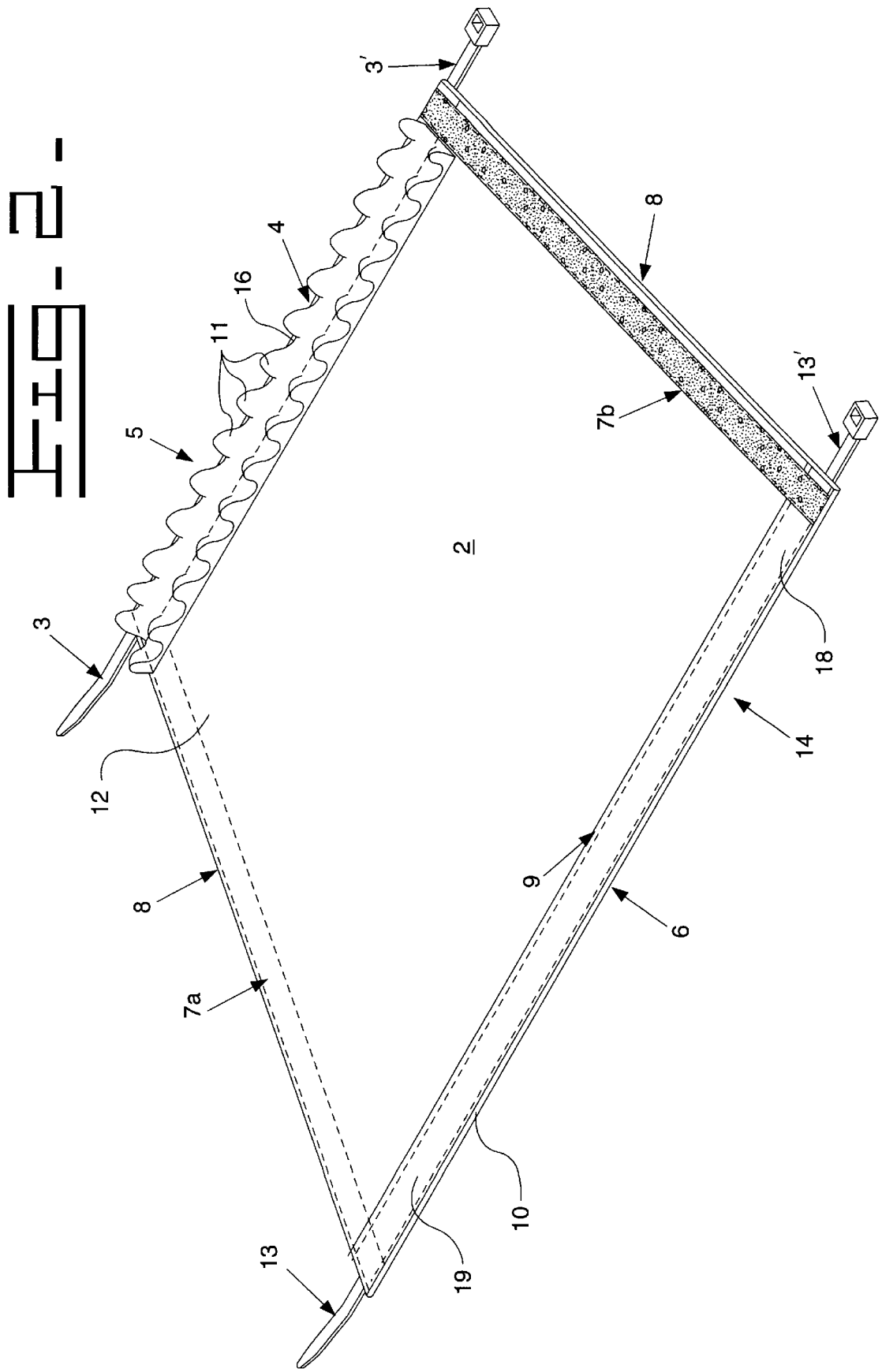

APPLICATOR FOR PROTECTIVE COATINGS

TECHNICAL FIELD

This invention relates generally to an apparatus that stores and applies protective coatings to parts of machines. More specifically it relates to an apparatus which stores a reserve of and applies corrosion inhibiting protectant to the rod of a hydraulic cylinder during movement of the rod.

BACKGROUND ART

Hydraulic components of machines may suffer damage from exposure to contaminants during periods of extended non-use or transportation of the machines. Hydraulic cylinder rods, a common hydraulic component, are sometimes susceptible to damage from environmental contaminants such as rain, dirt, and salt air. Prolonged exposure of the rod to these contaminants may cause damage to the surface finish of the rod, which in turn may cause leakage and performance degradation. To prevent damage from these contaminants hydraulic cylinder rods are often coated with a thin film of protectant. A common protectant comprises beeswax and petroleum lubricants, has a pasty texture, and is typically spread in a thin layer to cover the entire surface to be protected. While this protectant is an excellent protective compound, its effectiveness may diminish through dilution by environmental moisture or inadvertent removal. During shipping, hydraulic components are often actuated for the purpose of fitting the utilizing machine into tight quarters. Such actuation often has the effect of wiping the protectant from the rod during retraction of the rod relative to the cylinder. Also a worker may inadvertently brush against the previously coated rod with clothing, tools, or other items often resulting in removal of a portion of the coating and exposure of the rod to the surrounding environment. To fully obtain the benefits of the protectant the coating must be maintained.

In an effort to maintain the protective coating, individuals have created makeshift apparatus to supply a continuous layer of the protectant to the rod. One such method includes use of a makeshift apparatus which is fabricated by applying protectant to one side of a length of foam or fabric, the foam or fabric was next wrapped around the rod to form a collar. Tape was applied about the collar and extended to the cylinder. When the rod is thereafter extended it moves through the collar causing protectant to applied to the rod. Although this is often effective in maintaining a coating of protectant, it constitutes a labor-intensive method and supplies only a limited amount of protectant to accommodate sometimes repeated rod movement. During manual removal of the makeshift apparatus, paint on the machine is often removed with the tape.

DISCLOSURE OF THE INVENTION

This invention includes a sleeve having a wiper portion conforming to and selectively engageable with the rod of a hydraulic cylinder, and a first end removably securable in relation to the cylinder. The sleeve is split along a longitudinal seam which is closed, preferably, by a hook and loop strip or other fastening means.

BRIEF DESCRIPTION OF THE DRAWINGS

FIG. 2 is a perspective view of the applicator illustrating the primary components thereof.

BEST MODE FOR CARRYING OUT THE INVENTION

Figure 1:
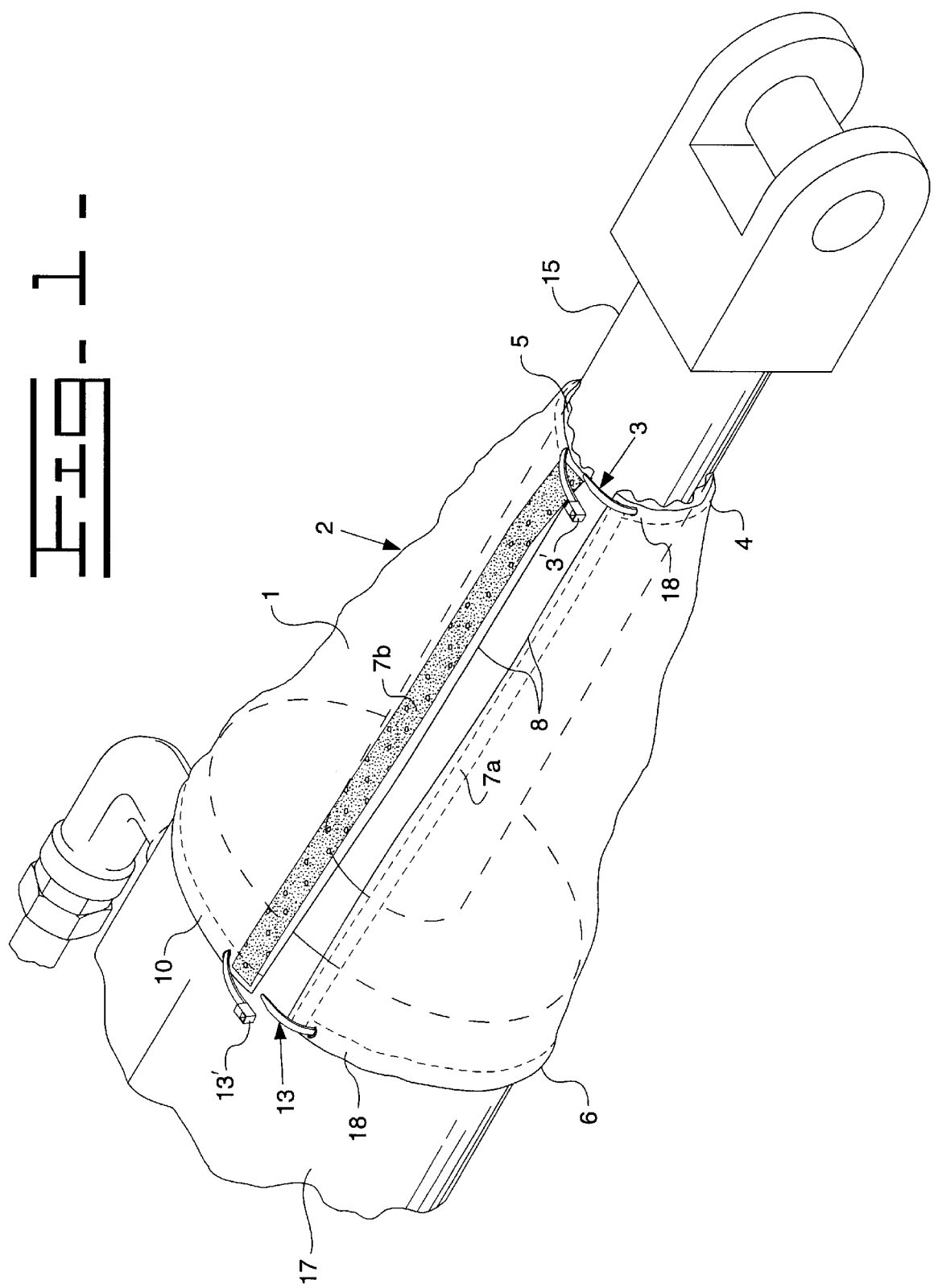
FIG. 1 is a perspective view showing the present invention applicator during installation on a hydraulic cylinder assembly.

With reference to the drawings, attention is directed to FIGS. 1 and 2, which respectively show the present invention applicator 1 installed on a hydraulic cylinder 17 about a cylinder rod 15 and uninstalled in an open configuration. As best shown in FIG. 1, the applicator 1 comprises a sleeve 2, a wiper portion 4, a pair of fastening devices 3 and 13 such as the illustrated ties 3' and 13' which are respectively disposed on a first end 5 and a second end 10 of the sleeve 2. Some equivalent alternatives to the ties 3' and 13' commonly known fasteners such as hose clamps, wire, or fabricated brackets. The sleeve 2 also has a pair of edges 8 which are substantially perpendicular to and extend between the ends 5 and 10. The applicator 1 also includes cooperating fastening portions 7a and 7b preferably respectively arranged along the opposed edges 8. The cooperating fastening portions 7a and 7b preferably comprise hook and loop segments, zipper elements, and or snap elements, although other embodiments of same can be used with equal facility in the present invention.

As shown in FIG. 2 the sleeve 2 comprises flexible material of predetermined thickness with a top surface 12 and a bottom surface 14. The wiper portion 4 is disposed at the first end 5 and may be formed from or attached to said first end. The wiper portion 4 preferably comprises a wiper surface having a convoluted surface 11 wherein each convolution is separated from its adjacent convolution by a valley such that the axis of each convolution is substantially perpendicular to the first end 5. The first and second ends 5 and 10 preferably have an elongated enclosure 16 and 18 which extend between the edges 8. The enclosures 16 and 18 are opened at each edge 8 and define cavities for encasing the ties 3' and 13'. On the top surface 12, in close proximity to and disposed along the length of one of the edges 8, is attached the first portion 7b of a fastener device preferably a hook or loop portion. On the bottom surface 14, in close proximity to and disposed along the other edge 8 is attached another fastener portion 7a which is selectively fastenable with the first portion 7b and preferably comprises the complement to the hook or loop portion 7b described above. Attached to the top surface 12 in close proximity to the second end 10 is a length of two-sided tape 9 which extends between the edges 8. The two-sided tape 9 has a bottom adhering surface attached to the top surface 12 and a top adhering surface which is protected by a removable member 19.

FIG. 1 shows the present invention applicator 1 partially installed on the hydraulic cylinder 17 and cylinder rod 15. Such installation will be described hereafter. The wiper portion 4 is disposed about the cylinder rod 15 at a distance from the hydraulic cylinder 17 of approximately one inch less than the distance between the ends 5 and 10. The edges 8 at the first end 5 are disposed in overlapping relation to facilitate cooperation between the cooperative fastener portions 7a and 7b. The wiper portion 4 is then preferably engaged with the cylinder rod by tightening the tie 3', until the desired degree of engagement is achieved. The second end 10 is then preferably disposed about the near end of the hydraulic cylinder 17. The edges 8 at the second end 10 are arranged in overlapping relation to facilitate cooperation between the fastener portions 7a and 7b. The first attachment portion 6 is preferably secured to the hydraulic cylinder 17 by tightening tie 13'. The remaining unattached fastener portions 7a and 7b are then joined together to form an enclosure around the near end of the hydraulic cylinder 17 and a portion of the cylinder rod 15.

INDUSTRIAL APPLICABILITY

This invention comprises a simple apparatus which, after applying a protectant to the rod 15 and when arranged in an installed configuration, maintains a thin layer of protectant on the rod 15 despite movement of the rod 15 relative to the cylinder 17 and constitutes a reservoir for housing the reserve of protectant. Prior to installation of the applicator 1 on a cylinder rod 15, the protectant is manually applied in a thin layer to cover the exposed rod 15. A reserve supply of protectant is also applied in a thick coating, to completely surround the rod 15 near the cylinder 17.

The wiper portion 4 of the applicator 1 is next circumferentially disposed about the rod 15 on the opposite side of the reserve from the cylinder 17. Using the plastic tie 3' the wiper portion 4 is secured to form an opening for receiving the rod 15 and provide selected engagement between the rod 15 and wiper portion 4. The sleeve 2 is next wrapped around the rod 15 to enclose the reserve of protectant and closed through the use of the hook and loop portions 7a and 7b. The second end 10 of the sleeve 2 is fixed relative to the cylinder 17 through use of the plastic tie 13'.

During usage of the machine, retraction of the cylinder rod 15 relative to the hydraulic cylinder 17 causes the wiper 4 to move toward the hydraulic cylinder 17 at the same time that the sleeve 2 bunches, bulges, and otherwise folds. As the reserve of protectant moves toward and contacts the end of the hydraulic cylinder 17 continued retraction of the rod 15 pushes the reserve toward and, if retracted to a sufficient degree, into the wiper 4. During extension of the cylinder rod 15 relative to the hydraulic cylinder 17, the wiper 4 moves with the cylinder rod 15 extending the sleeve 2 to its full length. When the sleeve 2 is fully extended, movement of the wiper 4 relative to the hydraulic cylinder 17 ceases, and continued extension of the cylinder rod 15 squeezes the reserve between the cylinder rod 15 and the now stationary wiper 4. Increasing the degree of engagement between the wiper 4 and the cylinder rod 15 decreases the thickness of the layer of protectant applied to the cylinder rod 15. Decreasing the degree of engagement between the wiper 4 and the cylinder rod 15 increases the thickness of the layer of protectant applied by the wiper 4 to the cylinder rod 15.

What is claimed is:

1. An apparatus for reserving and applying a protective coating to a hydraulic cylinder rod which protrudes from a hydraulic cylinder upon movement of the rod comprising:
   a sleeve of predetermined axial length having a wiper portion disposable about and selectively engaging the rod, the rod being moveable relative to said wiper portion, and having a first attachment portion;
   a fastening device for fixing said first attachment portion to the hydraulic cylinder.

2. The apparatus of claim 1, wherein said wiper portion includes an adjustable tie.

3. The apparatus of claim 1 wherein said sleeve comprises a relatively flexible material.

4. The apparatus of claim 1, wherein said sleeve comprises impervious material.

5. The apparatus of claim 1, wherein said fixing means comprises one of a tie which secures the sleeve to the cylinder and a bracket which secures the sleeve relative to the cylinder.

6. The apparatus of claim 1, wherein said fixing means comprises a two sided tape device, one side attached to the sleeve and the other side attachable to the cylinder.

7. The apparatus of claim 1, wherein said sleeve has two edges which, when fastened together, form a substantially closed member with an opening at opposite ends thereof.

8. The apparatus of claim 7, wherein said edges include a cooperative fabric hook and loop fastener.

9. The apparatus of claim 1, wherein said wiper portion has a convoluted surface engageable with the rod.

* * * * *

UNITED STATES PATENT AND TRADEMARK OFFICE
CERTIFICATE OF CORRECTION

PATENT NO. : 6,267,019 B1
DATED : July 31, 2001
INVENTOR(S) : Criston H. Andersen et al.

It is certified that error appears in the above-identified patent and that said Letters Patent is hereby corrected as shown below:

<u>Title page,</u>
Item [75], please add the following inventors,
-- Ralph J. Crabtree
Clarence A. Winspear Sr. --.

Signed and Sealed this

Fifth Day of November, 2002

*Attest:*

JAMES E. ROGAN
*Director of the United States Patent and Trademark Office*

*Attesting Officer*